United States Patent [19]

Bagepalli et al.

[11] Patent Number: 5,678,898
[45] Date of Patent: Oct. 21, 1997

[54] METHOD FOR MAKING A BRUSH SEAL

[75] Inventors: Bharat Sumpathkumar Bagepalli, Schenectady; Osman Saim Dinc, Troy; Robert Harold Cromer, Johnstown, all of N.Y.

[73] Assignee: General Electric Company, Schenectady, N.Y.

[21] Appl. No.: 425,008

[22] Filed: Apr. 17, 1995

[51] Int. Cl.⁶ .................................................. A46D 1/08
[52] U.S. Cl. ............................................................ 300/21
[58] Field of Search ............................. 300/21, 10, 2, 300/11; 228/173.5

[56] References Cited

U.S. PATENT DOCUMENTS

| | | | |
|---|---|---|---|
| 4,204,629 | 5/1980 | Bridges | 300/21 X |
| 4,415,309 | 11/1983 | Atterbury | |
| 4,730,876 | 3/1988 | Werner et al. | |
| 4,934,759 | 6/1990 | Bridges | 300/11 |
| 5,165,758 | 11/1992 | Howe | 300/21 |
| 5,265,412 | 11/1993 | Bagepalli et al. | |
| 5,403,071 | 4/1995 | Hostetler | 300/21 |
| 5,556,172 | 9/1996 | Howe | 300/21 |

*Primary Examiner*—John M. Husar
*Attorney, Agent, or Firm*—Douglas E. Erickson; Marvin Snyder

[57] ABSTRACT

A method for making a brush seal includes weaving a single-layer bristle assemblage having two spaced-apart cloth segments joined together by an unwoven section wherein the two cloth segments and the unwoven section share a common first group of warp bristles and wherein the two cloth segments have different groups of weft bristles. The method further includes the step of cutting generally across the unwoven section of the first group of bristles to create free ends. The brush seal so made is useful, for example, to generally seal a leakage gap in a gas path of a gas turbine.

10 Claims, 2 Drawing Sheets

METHOD FOR MAKING A BRUSH SEAL

BACKGROUND OF THE INVENTION

The present invention relates generally to seals, and more particularly to a method for making a brush seal useful, for example, to generally seal a gas-path leakage gap of a gas turbine.

Gas turbines include, but are not limited to, gas turbine power generation equipment and gas turbine aircraft engines. A gas turbine has a gas path which typically includes, in serial-flow relationship, an air intake (or inlet), a compressor, a combustor, a turbine, and a gas outlet (or exhaust nozzle). Gas leakage, either out of the gas path or into the gas path, from an area of higher pressure to an area of lower pressure is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between gas turbine subassemblies such as through gaps between the combustor and the turbine, and gas-path leakage occurs through gaps between the components that make up a gas turbine subassembly, such as through gaps between combustor casing segments. Such components and subassemblies have surfaces of different shapes, suffer from assembly misalignment, and undergo vibration. Hot-section components thermally experience hot gas flow and typically undergo different thermal growths.

Conventional seals are used in gas-path leakage gaps of gas turbines. However, conventional seals such as labyrinth, honeycomb, or leaf-spring seals cannot efficiently seal gas-path leakage gaps between gas turbine components having a variety of shapes and undergoing relative vibratory and/or rotary motion. Also, conventional brush seals, which have wire bristles conventionally welded to a bracket, cannot withstand temperatures greater than generally 900 degrees Fahrenheit. It is noted that conventional brush seals align their wire bristles to contact a rotating shaft at an angle between generally forty-five and generally sixty degrees with respect to a radius line from the shaft to the point of bristle contact, such bristle alignment creating a softer, longer-wearing brush-seal contact. Conventional brush seals are made in a costly, labor-intensive manner by manually handling the hundreds (or more) loose wire bristles and manipulating them into proper position to be welded to a bracket between the bracket's two cover plates.

What is needed is a method for making a brush seal that avoids the costly manual handling of the loose wire bristles, and especially a method for making a brush seal which can have its sealing bristles be easily welded to its bracket and which has good high-temperature sealing characteristics for generally sealing, for example, a gas-turbine gas-path leakage gap.

SUMMARY OF THE INVENTION

It is an object of the invention to provide a method for making a brush seal.

The method of the invention is for making a brush seal and includes a step of weaving a first bristle assemblage by weaving a first single-layer cloth segment from a first group of bristles and a second group of bristles such that the first cloth segment has a warp consisting essentially of one of the first and second groups of bristles and has a weft consisting essentially of the other of the first and second groups of bristles. The step of weaving also includes weaving a second single-layer cloth segment from the first group of bristles and a third group of bristles such that the second cloth segment has a warp consisting essentially of one of the first and third groups of bristles, has a weft consisting essentially of the other of the first and third groups of bristles, and is spaced apart from the first cloth segment leaving an unwoven section of the first group of bristles. The method also includes the step of cutting generally across the unwoven section of the first group of bristles to create free ends.

Several benefits and advantages are derived from the method of the invention. The first bristle assemblage may be woven on a loom eliminating the need for costly, manual handling of individual bristles. The first group of bristles, which includes the unwoven section which is used to perform the actual sealing, may be made from a material having good high-temperature sealing characteristics, such as ceramic bristles or oxide-dispersion-strengthened alloy bristles. The second group of bristles, which makes up the warp or weft of the first cloth segment, may be made from a material having good conventional-welding characteristics allowing the first cloth segment to be conveniently welded to a bracket between two cover plates.

BRIEF DESCRIPTION OF THE DRAWINGS

The accompanying drawings illustrate a preferred embodiment of the present invention wherein.

DETAILED DESCRIPTION OF THE INVENTION

Figure 1:
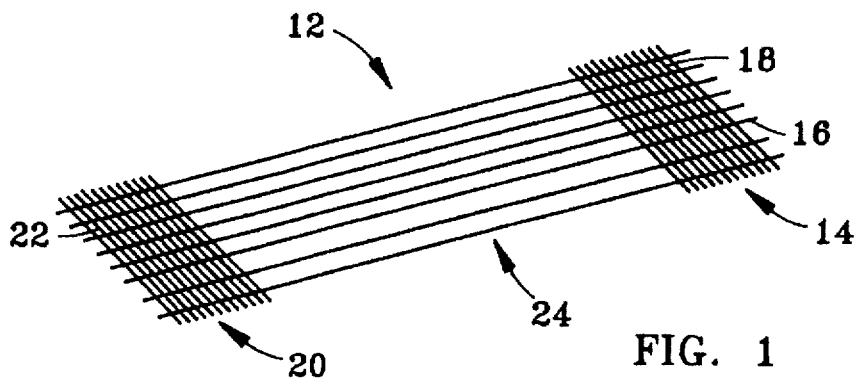
FIG. 1 is a schematic perspective view of a first bristle assemblage.

Referring now to the drawings, wherein like numerals represent like elements throughout, FIGS. 1–6 show various views depicting the different steps of a preferred method of the present invention. The method of the present invention is for making a brush seal 10, such brush seal 10 being shown in FIG. 6 and being suitable for generally sealing a gas-turbine gas-path leakage gap (not shown in the figures).

The basic method of the invention includes two steps {step a) and step b)}. The first step {step a)} is the step of weaving a first bristle assemblage 12, such woven first bristle assemblage 12 being shown in FIG. 1. Preferably, such weaving step {step a)} is performed on a conventional loom and includes two substeps {substeps a)1) and a)2)}. The first substep {substep a)1)} is the substep of weaving a first single-layer cloth segment 14 from a first group of bristles 16 and a second group of bristles 18 such that the first cloth segment 14 has a warp consisting essentially of one of the first and second groups of bristles 16 and 18 and has a weft consisting essentially of the other of the first and second groups of bristles 16 and 18. The second substep {substep a)2)} is the substep of weaving a second single-layer cloth segment 20 from the first group of bristles 16 and a third group of bristles 22 such that the second cloth segment 20 has a warp consisting essentially of one of the first and third groups of bristles 16 and 22, has a weft consisting essentially of the other of the first and third groups of bristles 16 and 22, and is spaced apart from the first cloth segment 14 leaving an unwoven section 24 of the first group of bristles 16. There can be tens, hundreds, thousands, or more individual bristles in each of the first, second, and third groups of bristles 16, 18, and 22.

The second step {step b)} of the method of the invention is the step of cutting generally across the unwoven section 24 of the first group of bristles 16 to create free ends 26. Preferably, such cutting step {step b)} is performed by EDM (electro-discharge-machining) cutting. Preferably, the method also includes, after step a) and before step b), the step of disposing the first cloth segment 14 between two cover plates 28 and 30 of a bracket 32.

In a preferred use, the brush seal 10 is for generally sealing a gas-turbine gas-path leakage-gap between spaced-apart first and second gas-turbine members (not shown in the figures) where the temperature in the gap may reach up to generally 1,800 degrees Fahrenheit or higher with the members undergoing vibration and/or relative rotation. In a preferred construction, the first group of bristles 16 is chosen from materials having good high-temperature seal characteristics and poor conventional-welding characteristics. Preferably, the first group of bristles 16 consists essentially of alloy bristles each comprising a yttrium oxide dispersoid. Such materials are known as oxide-dispersion-strengthened alloys and include, but are not limited to, INCOLOY alloy MA 956, and PM Hochtemperatur-Metall GmbH alloys PM1000, PM2000, and PM3030. In another preferred construction, the first group of bristles 16 consists essentially of ceramic bristles. In an exemplary construction, the second group of bristles 18 consists essentially of metal wires having poor high-temperature seal characteristics (especially poor strength) and good conventional-welding characteristics. Such materials include, but are not limited to, HS188, Hastalloy, and Haynes25. Preferably, both groups of bristles 16 and 18 are chosen to have good high-temperature oxidation resistance.

Preferably with such choice of bristle materials, the method further includes, after the disposing step and before step b), the step of welding the second group of bristles 18 only, of the first and second groups of bristles 16 and 18, in the first cloth segment 14 to the bracket 32. With the above-discussed choice of bristle materials, conventional welding techniques, when applied to weld the first cloth segment 14 to the bracket 32, will be able to weld the second group of bristles 18 but be unable to weld the first group of bristles 16, as can be appreciated by the artisan.

Figure 5:
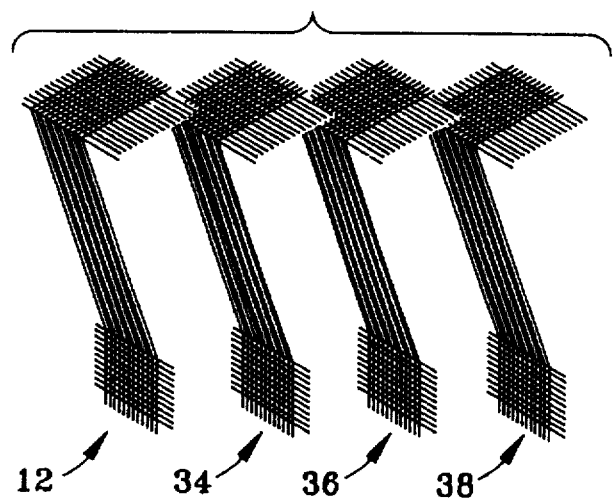
FIG. 5 is a schematic perspective view of four bristle assemblages which are ready to be stacked together.
Figure 6:
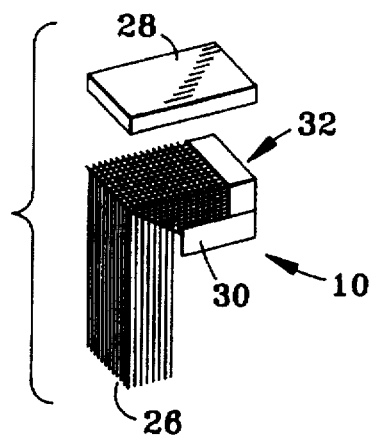
FIG. 6 is a schematic perspective view of the four bristle assemblages of FIG. 5 which have been stacked together, which have had their cloth segments welded to a bracket between two cover plates (with one of the cover plates shown detached from the bracket for clarity), and which have been cut generally across their unwoven sections of their first group of bristles to create free ends.

It is preferred that the method include, after step a) and before step b), the steps of weaving at least one additional bristle assemblage (such as the additional bristle assemblages 34, 36, and 38 shown in FIG. 5) generally identical to the first bristle assemblage 12 by repeating substeps a)1) and a)2), and stacking the at least one additional bristle assemblage 34, 36, and 38 together with the first bristle assemblage 12. In this preferred method, as can be appreciated by the artisan, step b) also includes cutting generally across the unwoven section of the first group of bristles of the at least one additional bristle assemblage 34, 36, and 38 to create additional free ends, as shown in FIG. 6.

Figure 2:
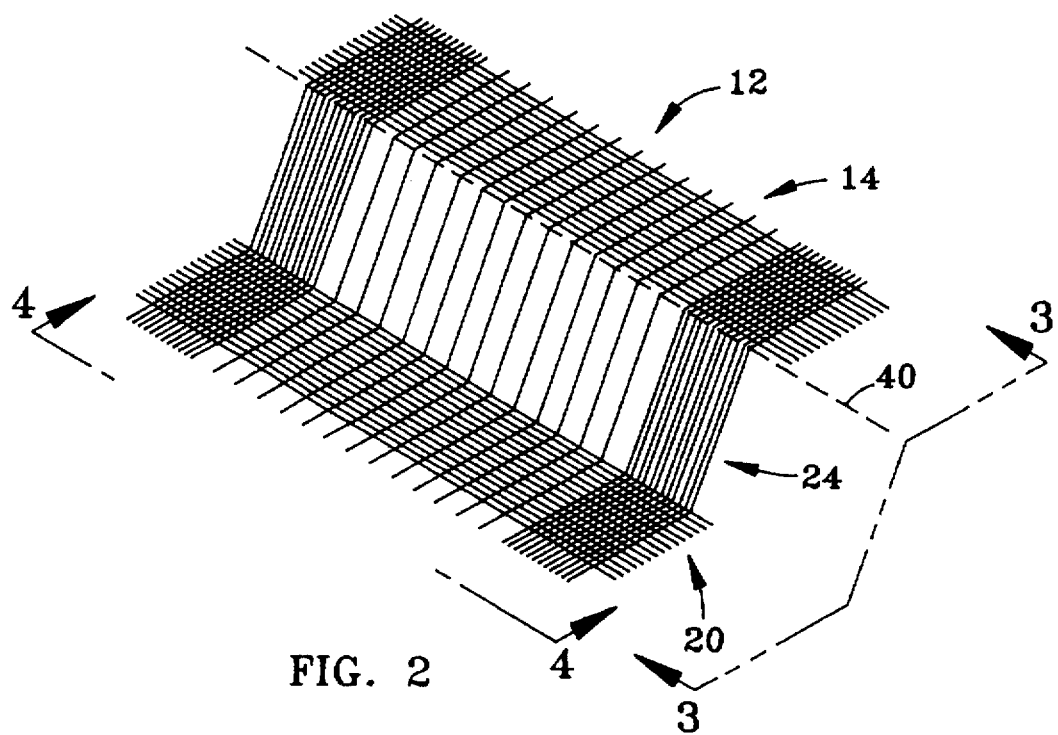
FIG. 2 is a schematic perspective view of the first bristle assemblage of FIG. 1 where the unwoven section has been bent and aligned at an angle with respect to the first single-layer cloth segment of the first bristle assemblage.
Figure 3:
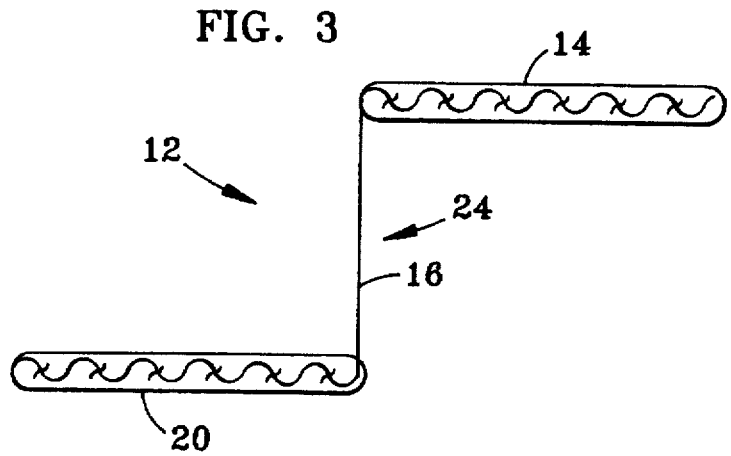
FIG. 3 is a schematic perspective view of the first bristle assemblage of FIG. 2 taken along lines 3—3 of FIG. 2 showing how the unwoven section of the first group of bristles has been bent.
Figure 4:
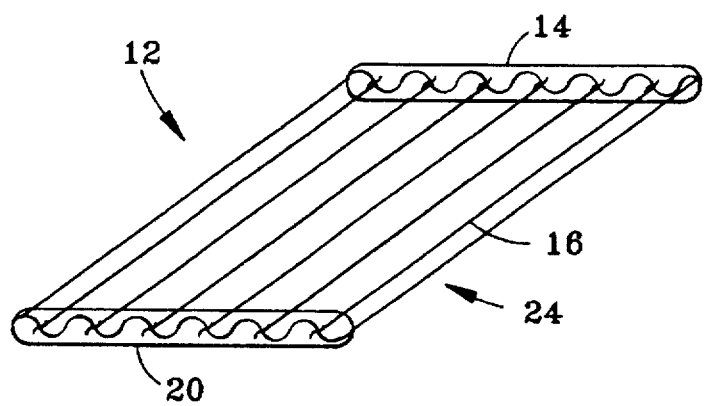
FIG. 4 is a schematic perspective view of the first bristle assemblage of FIG. 2 taken alone lines 4—4 of FIG. 2, showing how the unwoven section of the first group of bristles has been aligned at an angle.

After step a) and before step b), the method preferably includes the step of bending the unwoven section 24 with respect to the first cloth segment 14 such that the first cloth segment 14 lies generally in a first plane and the unwoven section 24 lies generally in a second plane which is aligned generally perpendicular to the first plane, as seen from FIGS. 2 and 3. After the bending step and before step b), the method preferably includes the step of aligning the unwoven section 24 at an angle in the second plane between generally forty-five degrees and generally sixty degrees from a normal to the first plane, as seen from FIGS. 2 and 4. Preferably, after step a) and before step b), the method includes the steps of weaving, bending, and aligning at least one additional bristle assemblage 34, 36, and 38 generally identical to the first bristle assemblage 12 by repeating substeps a)1) and a)2), the bending step, and the aligning step and the step of stacking the at least one additional bristle assemblage 34, 36, and 38 together with the first bristle assemblage 12, as shown in FIG. 5. In this preferred method, as can be appreciated by the artisan, step b) also includes cutting generally across the unwoven section of the first group of bristles of the at least one additional bristle assemblage 34, 36, and 38 to create additional free ends, as shown in FIG. 6.

The bending and aligning steps can be interchanged. Here, after step a) and before step b), the method preferably includes the step of aligning the first group of bristles 16 such that the first group of bristles 16 lies generally in a first plane and such that the first group of bristles 16 in the unwoven section 24 are aligned at an angle between generally forty-five degrees and generally sixty degrees with respect to the first group of bristles 16 in the first cloth segment 14. After the aligning step and before step b), the method preferably includes the step of bending the unwoven section 24 with respect to the first cloth segment 14 about an axis 40 which is generally parallel to the second group of bristles 18 such that the first cloth segment 14 lies generally in a first plane and the unwoven section 24 lies generally in a second plane which is aligned generally perpendicular to the first plane. Preferably, after step a) and before step b), the method includes the steps of weaving, aligning, and bending at least one additional bristle assemblage 34, 36, and 38 generally identical to the first bristle assemblage 12 by repeating substeps a)1) and a)2), the aligning step, and the bending step and the step of stacking the at least one additional bristle assemblage 34, 36, and 38 together with the first bristle assemblage 12, as shown in FIG. 5. In this preferred method, as can be appreciated by the artisan, step b) also includes cutting generally across the unwoven section of the first group of bristles of the at least one additional bristle assemblage 34, 36, and 38 to create additional free ends, as shown in FIG. 6.

It is noted that the free ends 26 of the unwoven section 24 of such bent & aligned or aligned & bent first group of bristles 16 will make a softer contact with a rotating surface for longer brush-seal wear. It is further noted that the first cloth segment 14 may be shaped to fit the particular shape of a gas-turbine member, and/or the unwoven section 24 with the free ends 26 may be bent and aligned to generally seal an adjacent gas-path leakage gap. In a particular brush seal application, not shown in the figures, it may be preferred not to bend or align the first group of bristles 16, as can be appreciated by those skilled in the art.

The advantage of the method of the invention is the creation of bristle assemblages (such as the first bristle assemblage 12 and the at least one additional bristle assemblage 34, 36, and 38) by a machine loom, such bristle assemblages: being easily handled, bent, and aligned by grasping their spaced-apart cloth segments (such as the first and second cloth segments 14 and 20); easily having their first cloth segment 14 welded to a bracket (such as bracket 32); and easily having their unwoven sections (such as the unwoven section 24) cut to create free ends 26. This is an improvement in time and money over the conventional method of making brush seals which requires manual handling of loose bristles.

The foregoing description of several preferred embodiments of the invention has been presented for purposes of illustration. It is not intended to be exhaustive or to limit the invention to the precise form disclosed, and obviously many modifications and variations are possible in light of the above teaching. For example, in the cutting step, the cut may be adjacent the second cloth segment 20 with the second cloth segment 20 thereafter being discarded, or the cut may be midway between the first and second cloth segments 14 and 20 with both cloth segments 14 and 20 being used to make the same brush seal or different brush seals. It is intended that the scope of the invention be defined by the claims appended hereto.

We claim:

1. A method for making a brush seal comprising the steps of:

a) weaving a first bristle assemblage by:

1) weaving a first single-layer cloth segment from a first group of bristles and a second group of bristles such that said first cloth segment has a warp consisting essentially of one of said first and second groups of bristles and has a weft consisting essentially of the other of said first and second groups of bristles; and 2) weaving a second single-layer cloth segment from said first group of bristles and a third group of bristles such that said second cloth segment has a warp consisting essentially of one of said first and third groups of bristles, has a weft consisting essentially of the other of said first and third groups of bristles, and is spaced apart from said first cloth segment leaving an unwoven section of said first group of bristles; and b) cutting generally across said unwoven section of said first group of bristles to create free ends.

2. The method of claim 1, also including, after step a) and before step b), the steps of weaving at least one additional bristle assemblage generally identical to said first bristle assemblage by repeating substeps a)1) and a)2) and stacking said at least one additional bristle assemblage together with said first bristle assemblage, and wherein step b) also includes cutting generally across said unwoven section of said first group of bristles of said at least one additional bristle assemblage to create additional free ends.

3. The method of claim 1, also including, after step a) and before step b), the step of bending said unwoven section with respect to said first cloth segment such that said first cloth segment lies generally in a first plane and said unwoven section lies generally in a second plane which is aligned generally perpendicular to said first plane.

4. The method of claim 3, also including, after said bending step and before step b), the step of aligning said unwoven section at an angle in said second plane between generally forty-five degrees and generally sixty degrees from a normal to said first plane.

5. The method of claim 4, also including, after step a) and before step b), the steps of weaving, bending, and aligning at least one additional bristle assemblage generally identical to said first bristle assemblage by repeating substeps a)1) and a)2), said bending step, and said aligning step and the step of stacking said at least one additional bristle assemblage together with said first bristle assemblage, and wherein step c) also includes cutting generally across said unwoven section of said first group of bristles of said at least one additional bristle assemblage to create additional free ends.

6. The method of claim 1, also including, after step a) and before step b), the step of aligning said first group of bristles such that said first group of bristles lies generally in a first plane and such that said first group of bristles in said unwoven section are aligned at an angle between generally forty-five degrees and generally sixty degrees with respect to said first group of bristles in said first cloth segment.

7. The method of claim 6, also including, after said aligning step and before step b), the step of bending said unwoven section with respect to said first cloth segment about an axis which is generally parallel to said second group of bristles such that said first cloth segment lies generally in said first plane and said unwoven section lies generally in a second plane which is aligned generally perpendicular to said first plane.

8. The method of claim 7, also including, after step a) and before step b), the steps of weaving, aligning, and bending at least one additional bristle assemblage generally identical to said first bristle assemblage by repeating substeps a)1) and a)2), said aligning step, and said bending step and the step of stacking said at least one additional bristle assemblage together with said first bristle assemblage, and wherein step c) also includes cutting generally across said unwoven section of said first group of bristles of said at least one additional bristle assemblage to create additional free ends.

9. The method of claim 1, also including, after step a) and before step b), the step of disposing said first cloth segment between two cover plates of a bracket.

10. The method of claim 9, also including, after said disposing step and before step b), the step of welding said second group of bristles only, of said first and second groups of bristles, in said first cloth segment to said bracket.

* * * * *